(12) United States Patent
Shao

(10) Patent No.: US 10,687,401 B2
(45) Date of Patent: Jun. 16, 2020

(54) LINEAR CONSTANT CURRENT DRIVE CIRCUIT

(71) Applicant: SHANGHAI LOOALL ELECTRONICS CO., LTD, Shanghai (CN)

(72) Inventor: Yunqi Shao, Shanghai (CN)

(73) Assignee: SHANGHAI LOOALL ELECTRONICS CO., LTD, Shanghai (CN)

( * ) Notice: Subject to any disclaimer, the term of this patent is extended or adjusted under 35 U.S.C. 154(b) by 0 days.

(21) Appl. No.: 16/340,569

(22) PCT Filed: Oct. 9, 2017

(86) PCT No.: PCT/CN2017/105342
§ 371 (c)(1),
(2) Date: Apr. 9, 2019

(87) PCT Pub. No.: WO2018/077021
PCT Pub. Date: May 3, 2018

(65) Prior Publication Data
US 2019/0239299 A1    Aug. 1, 2019

(30) Foreign Application Priority Data

Oct. 25, 2016   (CN) .......................... 2016 1 0956917

(51) Int. Cl.
*H05B 45/395* (2020.01)
*H02M 7/06* (2006.01)
(Continued)

(52) U.S. Cl.
CPC ............ *H05B 45/395* (2020.01); *H02M 7/06* (2013.01); *H05B 45/37* (2020.01); *H05B 45/44* (2020.01)

(58) Field of Classification Search
CPC ............ H05B 33/0815; H05B 33/0812; H05B 33/0824; H02M 7/06
(Continued)

(56) References Cited

U.S. PATENT DOCUMENTS

2015/0382419 A1* 12/2015 Jang .................... H05B 33/0818
315/224
2018/0069483 A1* 3/2018 Akiyama ................ H01L 33/00

FOREIGN PATENT DOCUMENTS

CN         103269537 A        8/2013
CN         103313489 A        9/2013
(Continued)

*Primary Examiner* — Dedei K Hammond
*Assistant Examiner* — Amy X Yang
(74) *Attorney, Agent, or Firm* — Bayramoglu Law Offices LLC

(57) ABSTRACT

A linear constant current drive circuit, including a first end of an LED string is connected to one output end of a rectifier bridge, a second end of the LED string is connected to one end of an energy storage capacitor by using a first switch subcircuit, and the other end of the energy storage capacitor is connected to the other output end of the rectifier bridge; one end of a second switch subcircuit is connected to a junction between the first switch subcircuit and the energy storage capacitor, and the other end of the second switch subcircuit is connected to a tap end of the LED string; and one end of a third switch subcircuit is connected to the second end of the LED string, and the other end of the third switch subcircuit is connected to a junction between the rectifier bridge and the energy storage capacitor.

14 Claims, 2 Drawing Sheets

(51) Int. Cl.
*H05B 45/37* (2020.01)
*H05B 45/44* (2020.01)

(58) Field of Classification Search
USPC .......................................................... 315/185
See application file for complete search history.

(56) References Cited

FOREIGN PATENT DOCUMENTS

| | | |
|---|---|---|
| CN | 106413192 A | 2/2017 |
| CN | 206118126 U | 4/2017 |

* cited by examiner

LINEAR CONSTANT CURRENT DRIVE CIRCUIT

CROSS REFERENCE TO THE RELATED APPLICATIONS

This application is the national phase entry of International Application No. PCT/CN2017/105342, filed on Oct. 9, 2017, which is based upon and claims priority to Chinese Patent Application No. 201610956917.8, filed on Oct. 25, 2016, the entire contents of which are incorporated herein by reference.

TECHNICAL FIELD

The present invention relates to an LED drive circuit, specifically to a linear constant current drive circuit, and in particular, to a linear constant current drive solution that can be implemented by using an integrated circuit.

BACKGROUND

In a current LED drive solution, a conventional high frequency switch mode power supply is mainstream. A high frequency switch circuit is used in the solution, and the circuit is complex and has high costs. Consequently, many vendors begin to study a linear constant current drive solution that is simple, reliable, and cheap.

FIG. 1 shows a linear constant current drive circuit that is currently used, including a mains VAC1, a rectifier bridge DB1, an LED string LED1, and a current source CC1.

The rectifier bridge DB1 has an input end connected to the mains VAC1, and an output end whose positive electrode is connected to an anode of LED1 and whose negative electrode is grounded. A cathode of LED1 is connected to the negative electrode of the rectifier bridge through the current source CC1.

In this solution, a part, of the mains, whose rectified voltage amplitude exceeds a voltage drop of LED1 is all converted into heat to be consumed by the constant current source CC1.

A voltage between two ends of the constant current source CC1 is a residual value obtained after a rectified voltage of the rectifier bridge overcomes the voltage drop of LED1. A larger residual value indicates a larger amount of heat generated by the constant current source CC1, lower efficiency of the circuit. To increase the efficiency, and reduce the amount of generated heat, the voltage drop of the LED needs to be as close as possible to the rectified voltage. However, in this way, when a voltage of the mains decreases, a current passing through LED1 relatively apparently decreases. Therefore, during actual application, a compromise selection needs to be made between the efficiency and an input voltage range. Currently, a relatively common configuration is: Under a 220 VAC input voltage, a total voltage of LED1 is designed to be 230 V to 260 V; under a 120 VAC input voltage, a total voltage of LED1 is designed to be 120 V to 135 V. The configuration applies to different power and different products. This causes a huge difficulty in solution design and cost control of an LED lighting product.

Therefore, a linear constant current circuit structure is needed, to allow a relatively wide range of LED voltages during fixed mains power supplying, so that a lighting designer more flexibly selects an LED.

SUMMARY

For the foregoing technical defect existing in the prior art, the present invention provides a linear constant current drive circuit, and a linear constant current drive circuit that is implemented by using an integrated circuit.

The present invention provides a linear constant current drive circuit, whose power is supplied by a mains, and including: a rectifier bridge, an LED string, an energy storage capacitor, a first switch subcircuit, a second switch subcircuit, and a third switch subcircuit, where: an input of the rectifier bridge is connected to the mains, and the rectifier bridge includes two output ends; the LED string is formed by connecting several LEDs in series, and has a first end, a second end, and a tap end, and the tap end is any tandem node or the first end of the LED string; the first end of the LED string is connected to one output end of the rectifier bridge, the second end of the LED string is connected to one end of the energy storage capacitor by using the first switch subcircuit, and the other end of the energy storage capacitor is connected to the other output end of the rectifier bridge, to form an energy absorption branch; one end of the second switch subcircuit is connected to a junction between the first switch subcircuit and the energy storage capacitor, and the other end of the second switch subcircuit is connected to the tap end of the LED string; one end of the third switch subcircuit is connected to the second end of the LED string, and the other end of the third switch subcircuit is connected to a junction between the rectifier bridge and the energy storage capacitor; the energy storage capacitor, the second switch subcircuit, an LED between the tap end and the second end of the LED string, and the third switch subcircuit form an energy discharge branch; and the two output ends of the rectifier bridge, the LED string, and the third switch subcircuit form an LED direct branch.

The present invention provides a linear constant current drive circuit, further characterized in that: when an output voltage amplitude of the rectifier bridge is greater than a sum of a voltage of the LED string and a voltage between the two ends of the energy storage capacitor, the first switch subcircuit and the energy absorption branch are turned on; and the second switch subcircuit, the third switch subcircuit, the energy discharge branch, and the LED direct branch are turned off; when an output voltage amplitude of the rectifier bridge is greater than a voltage of the LED string, but is less than a sum of the voltage of the LED string and a voltage between the two ends of the energy storage capacitor, the third switch subcircuit and the LED direct branch are turned on; and the first switch subcircuit, the second switch subcircuit, the energy absorption branch, and the energy discharge branch are all turned off; or when an output voltage amplitude of the rectifier bridge is less than a voltage of the LED string, the first switch subcircuit, the energy absorption branch, and the LED direct branch are turned off; and the second switch subcircuit, the third switch subcircuit, and the energy discharge branch are turned on.

The present invention provides a linear constant current drive circuit, further characterized in that: the third switch subcircuit is a controlled current source, the controlled current source is in a turn-off state when the energy absorption branch is turned on, is in a turn-on state when the energy absorption branch is not turned on, and has a current limiting function in the turn-on state.

The present invention provides a linear constant current drive circuit, further characterized in that: a current source is connected in series at any location on the energy absorption branch, and the current source bears a forward voltage when the energy absorption branch is turned on, and has the current limiting function.

The present invention provides a linear constant current drive circuit, further characterized in that: a current limiting value of the current source is greater than a current limiting value of the controlled current source.

The present invention provides a linear constant current drive circuit, further characterized in that: the first switch subcircuit and/or the second switch subcircuit is a diode.

The present invention provides a linear constant current drive circuit, further characterized in that: the linear constant current drive circuit further includes a first resistor, a second resistor, a third resistor, and a first integrated circuit, where: the first switch subcircuit is a first diode, the second switch subcircuit is a second diode, and the third switch subcircuit is a second integrated circuit; the rectifier bridge has the input connected to the mains, and an output whose first end is positive and whose second end is grounded; and the first integrated circuit and the second integrated circuit each have three pins, where a first pin is a current input end, a second pin is a chip ground, and a third pin is a current detection end; the first integrated circuit includes a first voltage controlled current source and a first signal reference, the first voltage controlled current source includes two power ends and two control ends, the two power ends of the first voltage controlled current source are respectively connected to the first pin and the third pin of the first integrated circuit, one control end of the first voltage controlled current source is connected to a positive electrode of the first signal reference, the other control end is connected to the third pin of the first integrated circuit, and a negative electrode of the first signal reference is connected to the second pin of the first integrated circuit; the second integrated circuit includes a second voltage controlled current source and a second signal reference, the second voltage controlled current source includes two power ends and two control ends, the two power ends of the second voltage controlled current source are respectively connected to the first pin and the third pin of the second integrated circuit, one control end of the second voltage controlled current source is connected to a positive electrode of the second signal reference, the other control end is connected to the third pin of the second integrated circuit, and a negative electrode of the second signal reference is connected to the second pin of the second integrated circuit; the first end of the LED string is connected to the first end of the output of the rectifier bridge, and the second end of the LED string is connected to an anode of the first diode, a cathode of the first diode is connected to the one end of the energy storage capacitor, the other end of the energy storage capacitor is connected to the first pin of the first integrated circuit by using the first resistor, and the third pin of the first integrated circuit is grounded by using the second resistor; the second pin of the first integrated circuit is grounded; an anode of the second diode is connected to a junction between the first diode and the energy storage capacitor, and a cathode of the second diode is connected to the tap end of the LED string; and the first pin of the second integrated circuit is connected to the second end of the LED string, the second pin of the second integrated circuit is connected to the first pin of the first integrated circuit, and the third pin of the second integrated circuit is connected to a junction between the energy storage capacitor and the first resistor by using the third resistor.

The present invention provides a linear constant current drive circuit, further characterized in that: the linear constant current drive circuit further includes a fourth resistor, a fifth resistor, and a third integrated circuit, where: the first switch subcircuit is a first diode, the second switch subcircuit is a second diode, and the third switch subcircuit is a fourth integrated circuit; the rectifier bridge has the input connected to the mains, and an output whose first end is positive and whose second end is grounded; and the third integrated circuit and the fourth integrated circuit each have three pins, where a first pin is a current input end, a second pin is a chip ground, and a third pin is a current detection end; the third integrated circuit includes a third voltage controlled current source and a third signal reference, the third voltage controlled current source includes two power ends and two control ends, the two power ends of the third voltage controlled current source are respectively connected to the first pin and the third pin of the third integrated circuit, one control end of the third voltage controlled current source is connected to a positive electrode of the third signal reference, the other control end is connected to the third pin of the third integrated circuit, and a negative electrode of the third signal reference is connected to the second pin of the third integrated circuit; the fourth integrated circuit includes a fourth voltage controlled current source and a fourth signal reference, the fourth voltage controlled current source includes two power ends and two control ends, the two power ends of the fourth voltage controlled current source are respectively connected to the first pin and the third pin of the fourth integrated circuit, one control end of the fourth voltage controlled current source is connected to a positive electrode of the fourth signal reference, the other control end is connected to the third pin of the fourth integrated circuit, and a negative electrode of the fourth signal reference is connected to the second pin of the fourth integrated circuit; the first end of the LED string is connected to the first end of the output of the rectifier bridge, and the second end of the LED string is connected to an anode of the first diode, a cathode of the first diode is connected to the one end of the energy storage capacitor, the other end of the energy storage capacitor is connected to the first pin of the third integrated circuit, and the third pin of the third integrated circuit is grounded by using the fourth resistor; the first pin of the fourth integrated circuit is connected to the second end of the LED string, and the third pin of the fourth integrated circuit is connected to the third pin of the third integrated circuit by using the fifth resistor; the second pin of the third integrated circuit and the second pin of the fourth integrated circuit are both grounded; and an anode of the second diode is connected to a junction between the first diode and the energy storage capacitor, and a cathode of the second diode is connected to the tap end of the LED string.

The present invention provides a linear constant current drive circuit, further characterized in that: the linear constant current drive circuit further includes a switch current source connected in parallel between the two ends of the output of the rectifier bridge, and the switch current source is turned off when either of the energy absorption branch and the LED direct branch is turned on, and is turned on when neither of the energy absorption branch and the LED direct branch is turned on.

The present invention provides a linear constant current drive circuit, and a linear constant current drive circuit that is implemented by using an integrated circuit. A beneficial effect of the present invention is: Under a fixed mains supply voltage, a relatively wide range of LED voltages can be allowed, so that a lighting designer more flexibly selects an LED.

DETAILED DESCRIPTION

The following further describes the present invention with reference to the accompanying drawings and specific embodiments.

Figure 1:
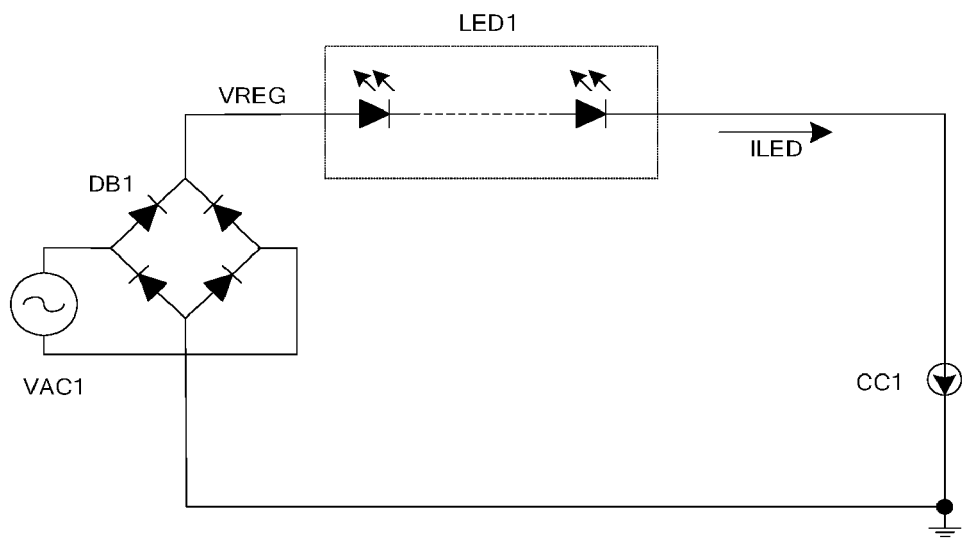
FIG. 1 shows a linear constant current drive circuit that is currently used.
Figure 2:
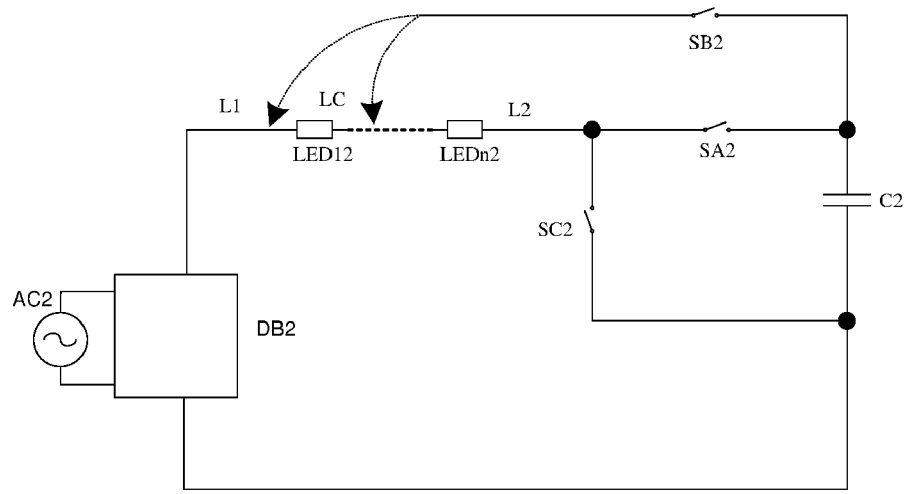
FIG. 2 is a principle diagram of a linear constant current drive circuit according to the present invention.

FIG. 2 is a principle diagram of a linear constant current drive circuit according to the present invention.

As shown in FIG. 2, the linear constant current drive circuit includes: a mains AC2, a rectifier bridge DB2, and an LED string that is formed by successively connecting an LED 12 to an LED n2 in series, an energy storage capacitor C2, a first switch subcircuit SA2, a second switch subcircuit SB2, and a third switch subcircuit SC2.

An input of the rectifier bridge DB2 is connected to the mains AC2, and the rectifier bridge DB2 includes two output ends.

The LED string is formed by connecting several LEDs, namely, the LED 12 to the LED n2 in series. The LED string has a first end L1, a second end L2, and a tap end LC, respectively defined as follows: One end of the LED 12 not connected to another LED is the first end L1, one end of the LED n2 not connected to another LED is the second end L2, and any tandem node or the first end of the LED string is the tap end LC.

The first end L1 of the LED string is connected to one output end of the rectifier bridge DB2, the second end L2 of the LED string is connected to one end of the energy storage capacitor C2 by using the first switch subcircuit SA2, and the other end of the energy storage capacitor C2 is connected to the other output end of the rectifier bridge DB2, to form an energy absorption branch.

One end of the second switch subcircuit SB2 is connected to a junction between the first switch subcircuit SA2 and the energy storage capacitor C2, and the other end of the second switch subcircuit SB2 is connected to the tap end LC of the LED string. One end of the third switch subcircuit SC2 is connected to the second end L2 of the LED string, and the other end of the third switch subcircuit SC2 is connected to the other output end of the rectifier bridge DB2. The energy storage capacitor C2, the second switch subcircuit SB2, the LED n2 between the tap end LC and the second end L2 of the LED string, and the third switch subcircuit SC2 form an energy discharge branch.

An output of the rectifier bridge DB1, the LED string, and the third switch subcircuit SC2 form an LED direct branch.

A work principle of the circuit is:

When an output voltage amplitude of the rectifier bridge DB2 is greater than a sum of a voltage of the LED string and a voltage between the two ends of the energy storage capacitor C2, the first switch subcircuit SA2 and the energy absorption branch are turned on; and the second switch subcircuit SB2, the third switch subcircuit SC2, the energy discharge branch, and the LED direct branch are turned off.

When an output voltage amplitude of the rectifier bridge DB2 is greater than a voltage of the LED string, but is less than a sum of the voltage of the LED string and a voltage between the two ends of the energy storage capacitor C2, the third switch subcircuit SC2 and the LED direct branch are turned on; and the first switch subcircuit SA2, the second switch subcircuit SB2, the energy absorption branch, and the energy discharge branch are all turned off.

When an output voltage amplitude of the rectifier bridge DB2 is less than a voltage of the LED string, the first switch subcircuit SA2, the energy absorption branch, and the LED direct branch are turned off; and the second switch subcircuit SB2, the third switch subcircuit SC2, and the energy discharge branch are turned on.

Therefore, the structure and the work principle of the circuit in FIG. 2 have the following beneficial effects:

(1) Peak energy of a rectified voltage of the mains is absorbed by using the energy storage capacitor, and the peak energy is discharged into some or all LEDs when a voltage of the mains is relatively low, preventing a disadvantage that a conventional linear constant current drive circuit converts a part, of the mains, whose rectified voltage amplitude exceeds an LED threshold voltage into heat. Therefore, in actual design of an LED lighting product, an LED string whose voltage drop is relatively low may be used.

(2) Because the LED string whose voltage drop is relatively low may be used, and the LED direct branch in FIG. 2 allows the LED string to be turned on under a relatively low voltage amplitude of the mains, an actual input voltage range of the LED lighting product is wider.

(3) The voltage of the LED string is relatively low, making a turn-on angle of an input current of the mains increase and a turn-on duty cycle larger. Therefore, a power factor is improved, and interference to a power grid is reduced.

(4) When a voltage drop of the mains is gradually reduced by using an alternating-current voltage regulator or a phase cut dimmer is connected in series to an alternating-current side to regulate light of LEDs, all of the LEDs have same brightness when the brightness is low.

(5) The foregoing (3) and (4) make the solution applicable to an occasion on which a phase cut dimmer is connected in series to an alternating-current side.

It is well known that, an LED is a current-type drive device. However, to simplify descriptions of ideas and a circuit principle of the present invention, FIG. 2 does not include any current limiting device.

The following processing may be performed on FIG. 2, to make the circuit become a practical linear constant current drive circuit:

(1) The third switch subcircuit SC2 in FIG. 2 is replaced with a controlled current source, and the controlled current source is enabled to be in the turn-off state when the energy absorption branch is turned on, and to be in the turn-on state when the energy absorption branch is not turned on.

(2) A current source is connected in series at any location on the energy absorption branch, and the current source has the current limiting function when the energy absorption branch is turned on.

(3) Each of the first switch subcircuit SA2 and the second switch subcircuit SB2 in FIG. 2 is replaced with a diode.

Figure 3:
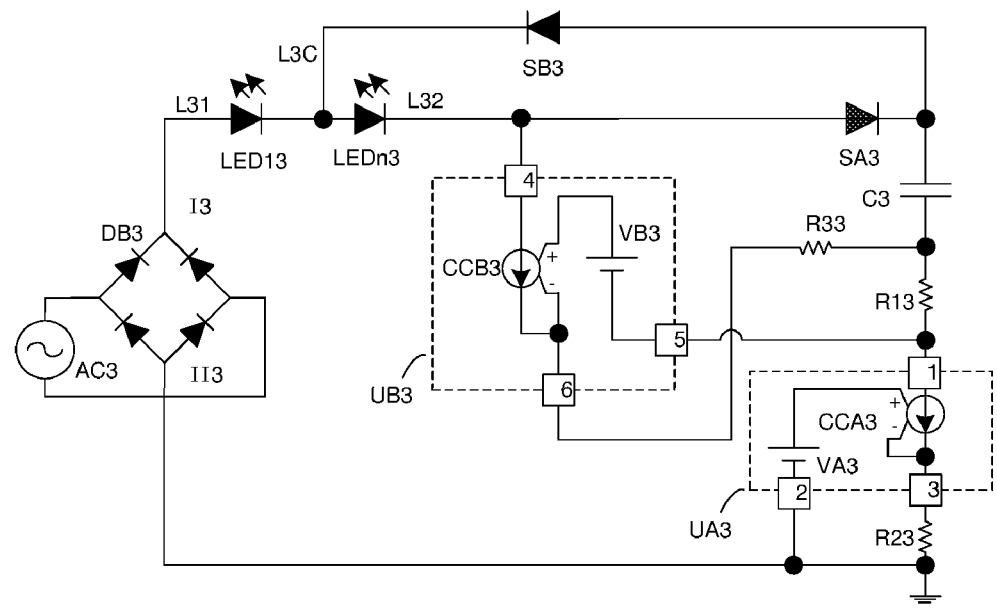
FIG. 3 is a diagram of a linear constant current drive circuit according to Embodiment 1.

FIG. 3 is a diagram of a linear constant current drive circuit according to Embodiment 1.

As shown in FIG. 3, the linear constant current drive circuit includes: a rectifier bridge DB3, an LED string, an energy storage capacitor C3, a first switch subcircuit SA3, a second switch subcircuit SB3, a first resistor R13, a second resistor R23, a third resistor R33, a first integrated circuit UA3, and a third switch subcircuit UB3.

The first switch subcircuit SA3 is a first diode, and the second switch subcircuit SB3 is a second diode. The third switch subcircuit UB3 is a second integrated circuit. The rectifier bridge DB3 has an input connected to a mains AC3, a first output end 13 being positive, and a second output end 113 grounded.

The LED string is formed by connecting several LEDs, namely, an LED 13 to an LED n3 in series, and has a first end L31, a second end L32, and a tap end L3C, respectively defined as follows: One end of the LED 13 not connected to another LED is the first end L31, one end of the LED n3 not connected to another LED is the second end L32, and any tandem node or the first end of the LED string is the tap end L3C.

The first integrated circuit UA3 and the second integrated circuit UB3 each have three pins, where a first pin is a current input end, a second pin is a chip ground, and a third pin is a current detection end.

The first integrated circuit UA3 includes a first voltage controlled current source CCA3 and a first signal reference VA3, the first voltage controlled current source CCA3 includes two power ends and two control ends, and the two power ends are respectively connected to the first pin 1 and the third pin 3 of the first integrated circuit UA3. One control end of the first voltage controlled current source CCA3 is connected to a positive electrode of the first signal reference VA3, the other control end is connected to the third pin 3 of the first integrated circuit UA3, and a negative electrode of the first signal reference VA3 is connected to the second pin 2 of the first integrated circuit UA3.

The second integrated circuit UB3 serving as the third switch subcircuit includes a second voltage controlled current source CCB3 and a second signal reference VB3, the second voltage controlled current source CCB3 includes two power ends and two control ends, and the two power ends are respectively connected to the first pin 4 and the third pin 6 of the second integrated circuit UB3. One control end of the second voltage controlled current source CCB3 is connected to a positive electrode of the second signal reference VB3, the other control end is connected to the third pin 6 of the second integrated circuit UB3, and a negative electrode of the second signal reference VB3 is connected to the second pin 5 of the second integrated circuit UB3.

The first end L31 of the LED string is connected to the first output end 13 of the rectifier bridge DB3, and the second end L32 is connected to an anode of the first diode SA3, a cathode of the first diode SA3 is connected to one end of the energy storage capacitor C3, the other end of the energy storage capacitor C3 is connected to the first pin 1 of the first integrated circuit UA3 by using the first resistor R13, and the third pin 3 of the first integrated circuit UA3 is grounded by using the second resistor R23.

The second pin 2 of the first integrated circuit UA3 and the second output end 113 of the rectifier bridge DB3 are grounded.

An anode of the second diode SB3 is connected to a junction between the first diode SA3 and the energy storage capacitor C3, and a cathode of the second diode is connected to the tap end L3C of the LED string.

The first pin 4 of the second integrated circuit UB3 is connected to the second end L32 of the LED string, the second pin 5 of the second integrated circuit UB3 is connected to the first pin 1 of the first integrated circuit UA3, and the third pin 6 of the second integrated circuit UB3 is connected to a junction between the energy storage capacitor C3 and the first resistor R13 by using the third resistor R33.

An output of the rectifier bridge DB3, the LED string, the first diode SA3, the energy storage capacitor C3, the first resistor R13, the first pin 1 to the third pin 3 of the first integrated circuit, and the second resistor R23 from an energy absorption branch.

The energy storage capacitor C3, the second diode SB3, the LED n3 between the tap end and the second end of the LED string, the first pin 4 to the third pin 6 of the second integrated circuit UB3, and the third resistor R33 form an energy discharge branch.

The output of the rectifier bridge DB3, the LED string, the first pin 4 to the third pin 6 of the second integrated circuit UB3, the third resistor R33, the first resistor R13, the first pin 1 to the third pin 2 of the first integrated circuit UA3, and the second resistor R23 form an LED direct branch.

A work principle of the circuit is:

When an output voltage amplitude of the rectifier bridge DB3 is greater than a sum of a voltage of the LED string and a voltage between the two ends of the energy storage capacitor C3, the first diode SA3 and the energy absorption branch are turned on; and the second diode SB3, the second integrated circuit UB3, the energy discharge branch, and the LED direct branch are turned off.

When an output voltage amplitude of the rectifier bridge DB3 is greater than a voltage of the LED string, but is less than a sum of the voltage of the LED string and a voltage between the two ends of the energy storage capacitor C3, the second integrated circuit UB3 and the LED direct branch are turned on; and the first diode SA3, the second diode SB3, the energy absorption branch, and the energy discharge branch are all turned off.

When an output voltage amplitude of the rectifier bridge DB3 is less than a voltage of the LED string, the first diode SA3, the energy absorption branch, and the LED direct branch are turned off; and the second diode SB3, the second integrated circuit UB3, and the energy discharge branch are turned on.

The linear constant current drive circuit in Embodiment 1 implements the beneficial effects of the present invention by using the two independent integrated circuits.

Embodiment 2

Figure 4:
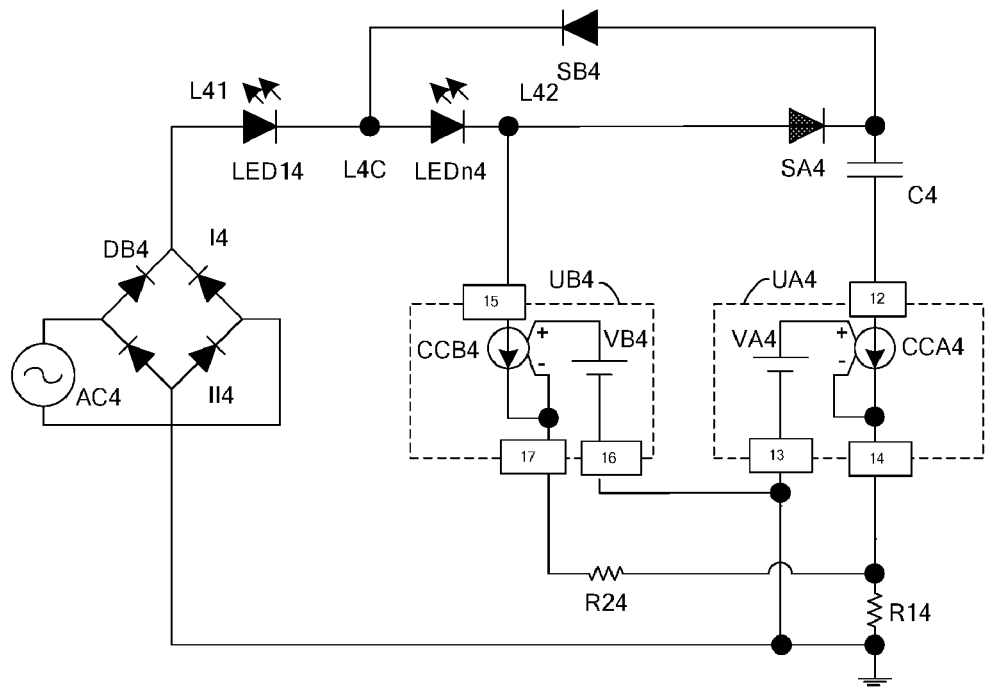
FIG. 4 is a diagram of a linear constant current drive circuit according to Embodiment 2.

FIG. 4 is a diagram of a linear constant current drive circuit according to Embodiment 2.

As shown in FIG. 4, the linear constant current drive circuit includes: a rectifier bridge DB4, an LED string, an energy storage capacitor C4, a first switch subcircuit SA4, a second switch subcircuit SB4, a fourth resistor R14, a fifth resistor R24, and a third integrated circuit UA4.

The first switch subcircuit SA4 is a first diode, the second switch subcircuit SB4 is a second diode, and a fourth integrated circuit UB4 serves as a third switch subcircuit.

The rectifier bridge DB4 has an input connected to a mains AC4, a first output end 14 being positive, and a second output end 114 grounded.

The LED string is formed by connecting several LEDs, namely, an LED 14 to an LED n4 in series, and has a first end L41, a second end L42, and a tap end L4C, respectively defined as follows: One end of the LED 14 not connected to another LED is the first end L41, one end of the LED n4 not connected to another LED is the second end L42, and any tandem node or the first end of the LED string is the tap end L4C.

The third integrated circuit UA4 and the fourth integrated circuit UB4 each have three pins.

The third integrated circuit UA4 includes a third voltage controlled current source CCA4 and a third signal reference VA4, the third voltage controlled current source CCA4 includes two power ends and two control ends, the two power ends of the third voltage controlled current source CCA4 are respectively connected to a first pin 12 and a third pin 14 of the third integrated circuit UA4, one of the two control ends of the third voltage controlled current source CCA4 is connected to a positive electrode of the third signal reference VA4, the other control end is connected to the third pin 14 of the third integrated circuit UA4, and a negative electrode of the third signal reference VA4 is connected to a second pin 13 of the third integrated circuit UA4.

The fourth integrated circuit UB4 includes a fourth voltage controlled current source CCB4 and a fourth signal reference VB4, the fourth voltage controlled current source CCB4 includes two power ends and two control ends, the two power ends of the fourth voltage controlled current source CCB4 are respectively connected to a first pin 15 and a third pin 17 of the fourth integrated circuit UB4, one of the two control ends of the fourth voltage controlled current source CCB4 is connected to a positive electrode of the fourth signal reference VB4, the other control end is connected to the third pin 17 of the fourth integrated circuit UB4, and a negative electrode of the fourth signal reference VB4 is connected to a second pin 16 of the fourth integrated circuit UB4.

The first end L41 of the LED string is connected to the first output end 14 of the rectifier bridge DB4, and the second end L42 is connected to an anode of the first diode SA4, a cathode of the first diode SA4 is connected to one end of the energy storage capacitor C4, the other end of the energy storage capacitor C4 is connected to the first pin 12 of the third integrated circuit UA4, and the third pin 14 of the third integrated circuit UA4 is grounded by using the fourth resistor R14.

The first pin 15 of the fourth integrated circuit UB4 is connected to the second end L42 of the LED string, and the third pin 17 of the fourth integrated circuit UB4 is connected to the third pin 14 of the third integrated circuit UA4 by using the fifth resistor R24.

The second pin 13 of the third integrated circuit UA4 and the second pin 16 of the fourth integrated circuit UB4 are both grounded.

An anode of the second diode SB4 is connected to a junction between the first diode SA4 and the energy storage capacitor C4, and a cathode of the second diode is connected to the tap end L4C of the LED string.

An output of the rectifier bridge DB4, the LED string, the first diode SA4, the energy storage capacitor C4, the first pin 12 to the third pin 14 of the third integrated circuit UA4, and the fourth resistor R14 form an energy absorption branch.

The energy storage capacitor C4, the second diode SB4, the LED n4 between the tap end L4C and the second end L42 of the LED string, the first pin 15 to the third pin 17 of the fourth integrated circuit UB4, the fifth resistor R24, and the third pin 14 to the first pin 12 of the third integrated circuit UA4 form an energy discharge branch.

The output of the rectifier bridge DB4, the LED string, the first pin 15 to the third pin 17 of the fourth integrated circuit UB4, the fifth resistor R24, and the fourth resistor R14 form an LED direct branch.

A work principle of the circuit is:

When an output voltage amplitude of the rectifier bridge DB4 is greater than a sum of a voltage of the LED string and a voltage between the two ends of the energy storage capacitor C4, the first diode SA4 and the energy absorption branch are turned on; and the second diode SB4, the fourth integrated circuit UB4, the energy discharge branch, and the LED direct branch are turned off.

When an output voltage amplitude of the rectifier bridge DB4 is greater than a voltage of the LED string, but is less than a sum of the voltage of the LED string and a voltage between the two ends of the energy storage capacitor C4, the fourth integrated circuit UB4 and the LED direct branch are turned on; and the first diode SA4, the second diode SB4, the energy absorption branch, and the energy discharge branch are all turned off.

When an output voltage amplitude of the rectifier bridge DB4 is less than a voltage of the LED string, the first diode SA4, the energy absorption branch, and the LED direct branch are turned off; and the second diode SB4, the fourth integrated circuit UB4, and the energy discharge branch are turned on.

The third integrated circuit UA4 and the fourth integrated circuit UB4 in this embodiment use a same ground level, and are conveniently integrated into one encapsulation to implement the beneficial effects of the present invention.

Based on all of the foregoing embodiments, a switch current source may be connected in parallel between the two ends of the output of the rectifier bridge. The switch current source is connected in parallel between the two ends of the output of the rectifier bridge, is turned off when either of the energy absorption branch and the LED direct branch is turned on, and is turned on when neither of the energy absorption branch and the LED direct branch is turned on. A beneficial effect of the present invention is: A current of the mains is maintained to be continuous, so that the present invention is better compatible with a power supplying occasion on which a conventional silicon-controlled dimmer is used.

The foregoing embodiments are intended to describe but not intended to limit the present invention. Without departing from the protection scope of the appended claims, this solution has various variations, and these variations and improvements all fall within the protection scope of the present invention. The term "comprise" or "include" does not exclude existence of those components or steps different from the components or steps listed in the claims. "a" or "one" component does not exclude existence of a plurality of components. In the claims in which several types of circuits are listed, several circuits of these circuits may be represented by one circuit. This is similar for electronic devices. The mere fact that some methods are described in dependent claims different from each other does not mean that a combination of these methods cannot be used to advantage.

What is claimed is:

1. A linear constant current drive circuit, whose power is supplied by a mains, comprising: a rectifier bridge, an LED string, an energy storage capacitor, a first switch subcircuit, a second switch subcircuit, and a third switch subcircuit, wherein, an input of the rectifier bridge is connected to the mains, and the rectifier bridge comprises a first output end and a second output end of the rectifier bridge;

the LED string is formed by connecting a plurality of LEDs in series, and has a first end, a second end, and a tap end, and the tap end is any tandem node or the first end of the LED string;

the first end of the LED string is connected to the first output end of the rectifier bridge, the second end of the LED string is connected to a first end of the energy storage capacitor by using the first switch subcircuit, and a second end of the energy storage capacitor is connected to the second output end of the rectifier bridge, to form an energy absorption branch;

a first end of the second switch subcircuit is connected to a junction between the first switch subcircuit and the energy storage capacitor, and a second end of the second switch subcircuit is connected to the tap end of the LED string;

a first end of the third switch subcircuit is connected to the second end of the LED string, and a second end of the third switch subcircuit is connected to a junction between the rectifier bridge and the energy storage capacitor;

the energy storage capacitor, the second switch subcircuit, an LED between the tap end and the second end of the LED string, and the third switch subcircuit form an energy discharge branch; and the first end of the rectifier bridge, the second end of the rectifier bridge, the LED string, and the third switch subcircuit form an LED direct branch, the linear constant drive circuit further comprises a first resistor, a second resistor, a third resistor, and a first integrated circuit, wherein the first switch subcircuit is a first diode, the second switch subcircuit is a second diode, and the third switch subcircuit is a second integrated circuit;

the rectifier bridge has the input connected to the mains, and the first output end of the rectifier bridge is positive and the second output end of the rectifier bridge is grounded; and the first integrated circuit and the second integrated circuit each have three pins including a first pin, a second pin and a third pin, wherein the first pin is a current input end, the second pin is a chip ground, and the third pin is a current detection end;

the first integrated circuit comprises a first voltage controlled current source and a first signal reference, the first voltage controlled current source comprises two power ends and two control ends, the two power ends of the first voltage controlled current source are respectively connected to the first pin and the third pin of the first integrated circuit, one control end of the first voltage controlled current source is connected to a positive electrode of the first signal reference, the other control end is connected to the third pin of the first integrated circuit, and a negative electrode of the first signal reference is connected to the second pin of the first integrated circuit;

the second integrated circuit comprises a second voltage controlled current source and a second signal reference, the second voltage controlled current source comprises two power ends and two control ends, the two power ends of the second voltage controlled current source are respectively connected to the first pin and the third pin of the second integrated circuit, one control end of the second voltage controlled current source is connected to a positive electrode of the second signal reference, the other control end is connected to the third pin of the second integrated circuit, and a negative electrode of the second signal reference is connected to the second pin of the second integrated circuit;

the first end of the LED string is connected to the first output end of the rectifier bridge, and the second end of the LED string is connected to an anode of the first diode, a cathode of the first diode is connected to the first end of the energy storage capacitor, the second end of the energy storage capacitor is connected to the first pin of the first integrated circuit by using the first resistor, and the third pin of the first integrated circuit is grounded by using the second resistor;

the second pin of the first integrated circuit is grounded;

an anode of the second diode is connected to a junction between the first diode and the energy storage capacitor, and a cathode of the second diode is connected to the tap end of the LED string; and the first pin of the second integrated circuit is connected to the second end of the LED string, the second pin of the second integrated circuit is connected to the first pin of the first integrated circuit, and the third pin of the second integrated circuit is connected to a junction between the energy storage capacitor and the first resistor by using the third resistor.

2. The linear constant current drive circuit according to claim 1, wherein, when an output voltage amplitude of the rectifier bridge is greater than a sum of a voltage of the LED string and a voltage between the first end and the second end of the energy storage capacitor, the first switch subcircuit and the energy absorption branch are turned on; and the second switch subcircuit, the third switch subcircuit, the energy discharge branch, and the LED direct branch are turned off;

when an output voltage amplitude of the rectifier bridge is greater than a voltage of the LED string, but is less than a sum of the voltage of the LED string and a voltage between the first end and the second end of the energy storage capacitor, the third switch subcircuit and the LED direct branch are turned on; and the first switch subcircuit, the second switch subcircuit, the energy absorption branch, and the energy discharge branch are all turned off; or when an output voltage amplitude of the rectifier bridge is less than a voltage of the LED string, the first switch subcircuit, the energy absorption branch, and the LED direct branch are turned off; and the second switch subcircuit, the third switch subcircuit, and the energy discharge branch are turned on.

3. The linear constant current drive circuit according to claim 2, further comprising a switch current source connected in parallel between the first output end and the second output end of the rectifier bridge, and the switch current source is turned off when either of the energy absorption branch and the LED direct branch is turned on, and is turned on when neither of the energy absorption branch and the LED direct branch is turned on.

4. The linear constant current drive circuit according to claim 1, wherein, the third switch subcircuit is a controlled current source, the controlled current source is in a turn-off state when the energy absorption branch is turned on, is in a turn-on state when the energy absorption branch is not turned on, and has a current limiting function in the turn-on state.

5. The linear constant current drive circuit according to claim 4, wherein, a current source is connected in series at any location on the energy absorption branch, and the current source has the current limiting function when the energy absorption branch is turned on.

6. The linear constant current drive circuit according to claim 5, wherein a current limiting value of the current source is greater than a current limiting value of the controlled current source.

7. The linear constant current drive circuit according to claim 4, further comprising a switch current source connected in parallel between the first output end and the second output end of the rectifier bridge, and the switch current source is turned off when either of the energy absorption branch and the LED direct branch is turned on, and is turned on when neither of the energy absorption branch and the LED direct branch is turned on.

8. The linear constant current drive circuit according to claim 5, further comprising a switch current source connected in parallel between the first output end and the second output end of the rectifier bridge, and the switch current source is turned off when either of the energy absorption branch and the LED direct branch is turned on, and is turned on when neither of the energy absorption branch and the LED direct branch is turned on.

9. The linear constant current drive circuit according to claim 6, further comprising a switch current source connected in parallel between the first output end and the second output end of the rectifier bridge, and the switch current source is turned off when either of the energy absorption branch and the LED direct branch is turned on, and is turned on when neither of the energy absorption branch and the LED direct branch is turned on.

10. The linear constant current drive circuit according to claim 1, wherein the first switch subcircuit and/or the second switch subcircuit is a diode.

11. The linear constant current drive circuit according to claim 10, further comprising a switch current source connected in parallel between the first output end and the second output end of the rectifier bridge, and the switch current source is turned off when either of the energy absorption branch and the LED direct branch is turned on, and is turned on when neither of the energy absorption branch and the LED direct branch is turned on.

12. The linear constant current drive circuit according to claim 1, further comprising a fourth resistor, a fifth resistor, and a third integrated circuit, wherein,
the first switch subcircuit is a first diode, the second switch subcircuit is a second diode, and the third switch subcircuit is a fourth integrated circuit;
the rectifier bridge has the input connected to the mains, and the first output end of the rectifier bridge is positive and the second output end of the rectifier bridge is grounded; and the third integrated circuit and the fourth integrated circuit each have three pins including a first pin, a second pin and a third pin, wherein the first pin is a current input end, the second pin is a chip ground, and the third pin is a current detection end;
the third integrated circuit comprises a third voltage controlled current source and a third signal reference, the third voltage controlled current source comprises two power ends and two control ends, the two power ends of the third voltage controlled current source are respectively connected to the first pin and the third pin of the third integrated circuit, one control end of the third voltage controlled current source is connected to a positive electrode of the third signal reference, the other control end is connected to the third pin of the third integrated circuit, and a negative electrode of the third signal reference is connected to the second pin of the third integrated circuit;
the fourth integrated circuit comprises a fourth voltage controlled current source and a fourth signal reference, the fourth voltage controlled current source comprises two power ends and two control ends, the two power ends of the fourth voltage controlled current source are respectively connected to the first pin and the third pin of the fourth integrated circuit, one control end of the fourth voltage controlled current source is connected to a positive electrode of the fourth signal reference, the other control end is connected to the third pin of the fourth integrated circuit, and a negative electrode of the fourth signal reference is connected to the second pin of the fourth integrated circuit;
the first end of the LED string is connected to the first output end of the rectifier bridge, and the second end of the LED string is connected to an anode of the first diode, a cathode of the first diode is connected to the first end of the energy storage capacitor, the second end of the energy storage capacitor is connected to the first pin of the third integrated circuit, and the third pin of the third integrated circuit is grounded by using the fourth resistor;
the first pin of the fourth integrated circuit is connected to the second end of the LED string, and the third pin of the fourth integrated circuit is connected to the third pin of the third integrated circuit by using the fifth resistor;
the second pin of the third integrated circuit and the second pin of the fourth integrated circuit are both grounded; and
an anode of the second diode is connected to a junction between the first diode and the energy storage capacitor, and a cathode of the second diode is connected to the tap end of the LED string.

13. The linear constant current drive circuit according to claim 12, further comprising a switch current source connected in parallel between the first output end and the second output end of the rectifier bridge, and the switch current source is turned off when either of the energy absorption branch and the LED direct branch is turned on, and is turned on when neither of the energy absorption branch and the LED direct branch is turned on.

14. The linear constant current drive circuit according to claim 1, further comprising a switch current source connected in parallel between the first output end and the second output end of the rectifier bridge, and the switch current source is turned off when either of the energy absorption branch and the LED direct branch is turned on, and is turned on when neither of the energy absorption branch and the LED direct branch is turned on.

* * * * *